Oct. 14, 1941.　　　O. MERTEN　　　2,258,590
GAS VALVE FOR LIQUID HEATERS
Filed Aug. 26, 1939　　　2 Sheets—Sheet 1

Inventor:
Otto Merten
by Roy F. Steward
his attorney

Oct. 14, 1941.　　　　O. MERTEN　　　　2,258,590

GAS VALVE FOR LIQUID HEATERS

Filed Aug. 26, 1939　　　2 Sheets-Sheet 2

Inventor:
Otto Merten
by Roy F. Steward
his attorney

Patented Oct. 14, 1941

2,258,590

UNITED STATES PATENT OFFICE 2,258,590

GAS VALVE FOR LIQUID HEATERS

Otto Merten, Dessau, Anhalt, Germany, assignor to Junkers & Co. G. m. b. H., Dessau, Germany Application August 26, 1939, Serial No. 292,131
In Germany September 6, 1938

11 Claims. (Cl. 236—25)

The invention relates to a gas valve for liquid heaters and adapted to be controlled by a liquid-deficiency device.

An arrangement is known in which the gas valve is locked in the closed position by means of a lever and eccentric. This arrangement, however, is disadvantageous inasmuch as when the hot water tap is turned on the locked valve prevents the diaphragm of the fluid-deficiency device from being deflected as far as its stop, and the transmission spindle has to take up the full pressure of the diaphragm and is consequently liable to buckle under the resulting pressure.

In another known arrangement a resilient coupling is interposed between the fluid-deficiency device and the gas valve, said coupling serving, however, merely as a brake for the liquid and not as a resilient intermediate device.

A further arrangement is also known in which the ignition valve is opened prior to the main valve by the actuation of the fluid-deficiency device. This, however, has the disadvantage that the ignition burner cannot be lighted until after the hot water tap has been turned on.

It is an object of the present invention to provide a main gas valve which is actuated by a liquid deficiency device through a resilient coupling whereby buckling of the spindle transmitting the actuating force is avoided.

It is another object of the invention to provide such a valve having adjustable stop means for limiting the movement imparted thereto.

A further object of the invention is to provide a main gas valve in combination with an ignition valve and arranged in such a manner that the ignition valve can be opened without opening the main gas valve.

According to the present invention it is proposed to provide a compressible resilient intermediate device between the gas valve and the operative member of the liquid deficiency device and to provide an adjustable stop adapted to limit the movement imparted to the gas valve.

This arrangement enables the operative member of the gas valve, a diaphragm, for example, to be moved as far as the upper stop in the diaphragm chamber since the stroke of the diaphragm is absorbed in compressing the intermediate device, thereby preventing the transmission spindle from becoming unduly loaded and consequently buckled.

In the case of a gas valve in which the liquid deficiency device is not coupled for the transmission of force with the gas cock until after the stroke needed for opening an ignition valve has been performed, the resilient intermediate device is located between the liquid deficiency device and the ignition valve, the spring of the intermediate device being weaker in the expanded condition but more powerful in the compressed condition than the spring loading the main valve.

The result obtained in this manner is that after the liquid-deficiency device has been coupled with the main gas valve, the latter opens against the action of its loading spring on the liquid deficiency device being actuated.

The adjustable stop may be arranged in such a manner as to limit the stroke of the ignition valve and for the purpose of enabling the ignition flame to be lighted can be fixed in such a position that the ignition valve can describe its opening stroke without the main gas valve being opened.

This arrangement thus dispenses with a separate ignition cock to enable the ignition flame to be lighted.

Other features of the invention are explained in the following description.

To enable the invention to be fully understood it will now be described with reference to the accompanying drawings which illustrate a typical embodiment of the invention, and in which:

Fig. 1 is a sectional view of a gas-heated water heater in which a resilient intermediate device is located between a liquid-deficiency device and the gas valve controlled by the latter, the whole apparatus being in neutral position, i. e. the ignition valve and main gas valve are closed, Fig. 2 is an elevation of the gas valve in the neutral position, Fig. 3 is a longitudinal section through the gas valve in the operative position, i. e. ignition valve opened and main gas valve closed, Fig. 4 is an elevation of the gas valve according to Fig. 3, Fig. 5 is a longitudinal section of the gas valve in the operative position, i. e. the ignition valve open and main gas valve closed but ready to be opened by the liquid-deficiency device.

Figure 1:
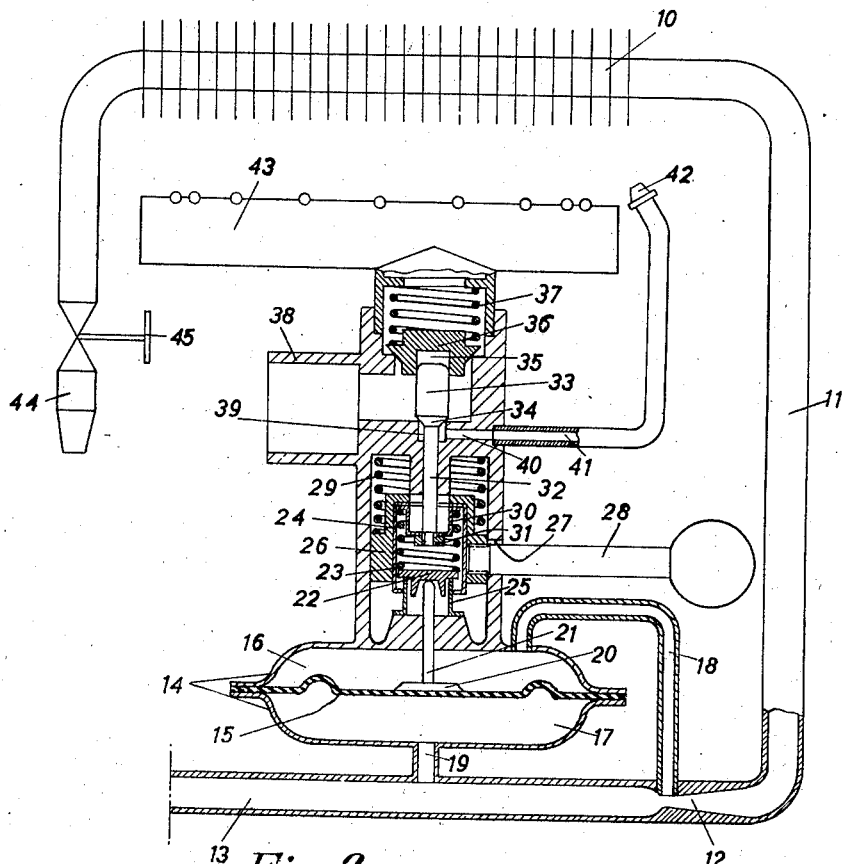

As shown in the drawings a water heater is diagrammatically illustrated in the drawings by a gilled pipe 10 which is placed in communication with the cold water intake 13 by a pipe 11 in which is located a Venturi tube 12. The liquid deficiency device for the water heater consists in known manner of a casing 14 and diaphragm 15 which divides the casing into two compartments 16 and 17. The upper compartment 16 communicates through a tube 18 with the narrowest cross section of the Venturi tube whilst the lower compartment 17 is connected with the cold water inlet 13 through the tube 19 on the inlet side of the Venturi tube 12. Resting on the diaphragm 15 is a plate 20 carrying a spindle 21 on which is loosely seated a compressible resilient intermediate device comprising a plate 22, spring 23 and casing 24. A flanged sleeve 25 limits the downward stroke of the casing 24. A movable stop 26 is provided having a handle 28 guided in an oblique slot 27. The stop 26 is loaded by a spring 29 which opposes the opening movement. A valve spindle 32, 33 is secured to a member 30 by means of a nut 31 and the lower portion 32 of the valve spindle is reduced in diameter, the transition zone to the upper portion 33, which is of greater diameter, forming the ignition valve 34. The upper portion 33 is loosely guided in a bore 35 of a main gas valve 36 which is pressed against its seat by a spring 37. When the ignition valve 34 is open the gas flows through an inlet pipe 38 into a small chamber 39 from which it passes through a bore 40 and a tube 41 to an ignition burner 42 and is there ignited. If the main gas valve 36 be now opened gas flows to the main burner 43 and is there ignited by the ignition burner 42. The heated water leaves the heater 10 through a discharge branch 44 which is controlled by a valve or tap 45.

Figure 2:
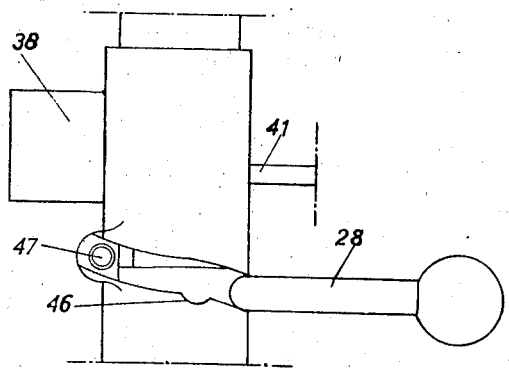
Figure 4:
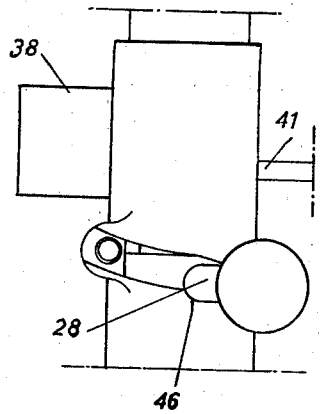
Figure 6:
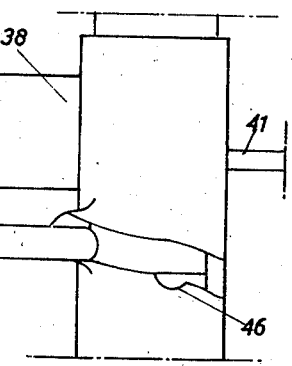
Fig. 6 is an elevation of the gas valve shown in Fig. 5.
Figure 7:
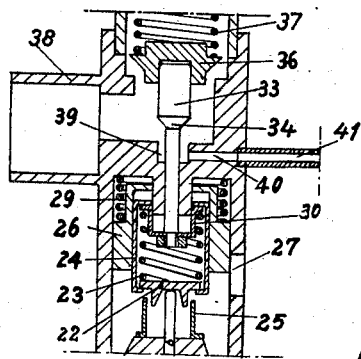
Fig. 7 is the same longitudinal section as Fig. 5 but after the hot water tap has been turned on the gas valve being thus opened by the liquid-deficiency device.

Figs. 2, 4 and 6 show a notch 46 in the oblique slot 27 for setting the ignition position of the handle 28 and a screw stop 47 on the casing by means of which the handle can be set for the admission of gas to the main gas valve.

Figure 3:
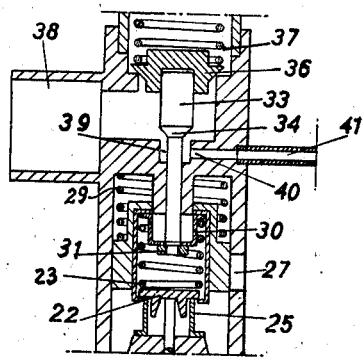
Figure 5:
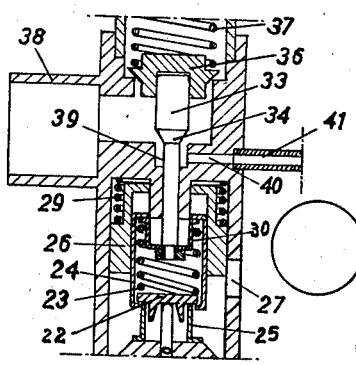

The arrangement functions in the following manner: To start the water heater in operation the movable stop 26 is adjusted by moving the handle 28 in the oblique slot 27 until it reaches the notch 46, the spring 29 being compressed. The spring 23 which is in the compressed condition when in neutral position and is then stronger than the spring 37 which presses the main gas valve 36 on its seat now expands and thus lifts the casing 24 of the intermediate device and therewith the valve spindle 32, 33 thereby opening the ignition valve. The position is now that shown in Figs. 3 and 4. On the stop 26 being further moved until the handle meets the screw stop 47 (Figs. 5 and 6) there is no change in the position of the intermediate member, since the spring 23 is now only under its initial tension in which condition it is weaker than the main gas-valve spring 37. Consequently the main gas valve still remains closed. If the tap 45 be now turned on the water in the compartment 17 below the diaphragm exerts a greater pressure on the diaphragm 15. At the same time the negative pressure set up in the upper compartment 16 through the tube 18 in communication with the narrowest portion of the Venturi tube 12 comes into operation so that the diaphragm 15 is forced upwards and the main gas valve 36 is lifted from its seat by the intermediate device against the action of the spring 37. This arrangement makes it impossible for the diaphragm spindle to buckle due to excessive pressure. The gas can then flow to the main burner 43 where it is ignited by the flame of the ignition burner 42.

I claim:

1. A gas valve for liquid heaters adapted to be controlled by a liquid-deficiency device comprising a compressible resilient intermediate device located between the gas valve and the operative member of the liquid-deficiency device, said compressible resilient intermediate device yielding to permit operation of said liquid-deficiency device when the gas valve is held against movement, and manually operable adjustable stop means for controlling the operation of said intermediate device and which is adapted to limit the movement imparted to the gas valve, said stop means being movable to prevent operation of said gas valve at certain times but permitting operation of said liquid-deficiency device at all times.

2. A gas valve according to claim 1 including a main gas valve and an ignition valve and in which operative coupling of the liquid-deficiency device to the main gas valve by said intermediate device, whereby the main gas valve can be actuated by said liquid-deficiency device, is prevented until the stroke needed for opening the ignition valve has been effected and wherein the resilient intermediate device is located between the liquid-deficiency device and the ignition valve, said intermediate device including a spring which is weaker in the expanded condition and more powerful in the compressed condition than a spring loading the main valve.

3. A gas valve according to claim 1 including an ignition valve and wherein the adjustable stop means limits the lift of the ignition valve and for the purpose of enabling the ignition flame to be lighted can be fixed in such a position that the ignition valve can be opened separately from opening of the main gas valve.

4. A gas valve according to claim 1 wherein the adjustable stop means are operable by a handle guided in an oblique slot.

5. A gas valve according to claim 1 wherein the adjustable stop means are operable by a handle guided in an oblique slot and are loaded by a spring which opposes movement by the handle, said oblique slot being provided with notches for setting the position of the handle.

6. A gas valve according to claim 1 wherein the adjustable stop comprises a bush which is guided in a casing and accommodates and guides the resilient intermediate device which comprises a cylinder and piston with interposed spring.

7. A gas valve according to claim 1 including an ignition valve and wherein the adjustable stop means limits the lift of the ignition valve and for the purpose of enabling the ignition flame to be lighted can be moved to a position whereby the ignition valve can be opened separately from opening of the main gas valve, said adjustable stop means being operable by a handle guided in an oblique slot.

8. A gas valve for liquid heaters comprising a main gas valve, an ignition valve, a liquid-deficiency device, spring coupling means between said valves and said device arranged to transmit motion from said device to said main gas valve and being yieldable to permit movement of said device when said main gas valve is held against movement, and manually operable stop means controlling the operation of said coupling means, said stop means being movable successively from a position where both valves are held against movement to a position permitting the coupling means to open the ignition valve but not the main gas valve and then movable to a position permitting said coupling means to open said main gas valve when the tension on the spring coupling means is increased by the liquid-deficiency device.

9. A gas valve for liquid heaters comprising a main gas valve, an ignition valve, a liquid-deficiency device, spring coupling means between said valves and said device arranged to open said ignition valve and to transmit motion from said device to said main gas valve and being yieldable to permit movement of said device when said main gas valve is held against movement, and manually operable stop means controlling the operation of said coupling means, said stop means being movable to close said ignition valve against the tension of said coupling means and to permit said coupling means to open said ignition valve, said stop means also being movable to permit said device to operate said main gas valve through said coupling means after said ignition valve is opened.

10. A gas valve according to claim 8 including a spring loading the main gas valve and urging it to closed position, said coupling means including a spring which is weaker in the expanded position and more powerful in the compressed condition than the spring loading the main valve, movement of said stop means compressing said last-mentioned spring or allowing it to expand.

11. A gas valve according to claim 1 including a main gas valve and an ignition valve and in which operative coupling of the liquid-deficiency device to the main gas valve by said intermediate device, whereby the main gas valve can be actuated by said liquid-deficiency device, is prevented until the stroke needed for opening the ignition valve has been effected and wherein the resilient intermediate device is located between the liquid-deficiency device and the ignition valve.

OTTO MERTEN.